Nov. 10, 1931.  D. O. BARRETT  1,831,646
STARTING AND CONTROLLING MECHANISM FOR DIESEL ENGINES
Filed April 29, 1926   6 Sheets-Sheet 1
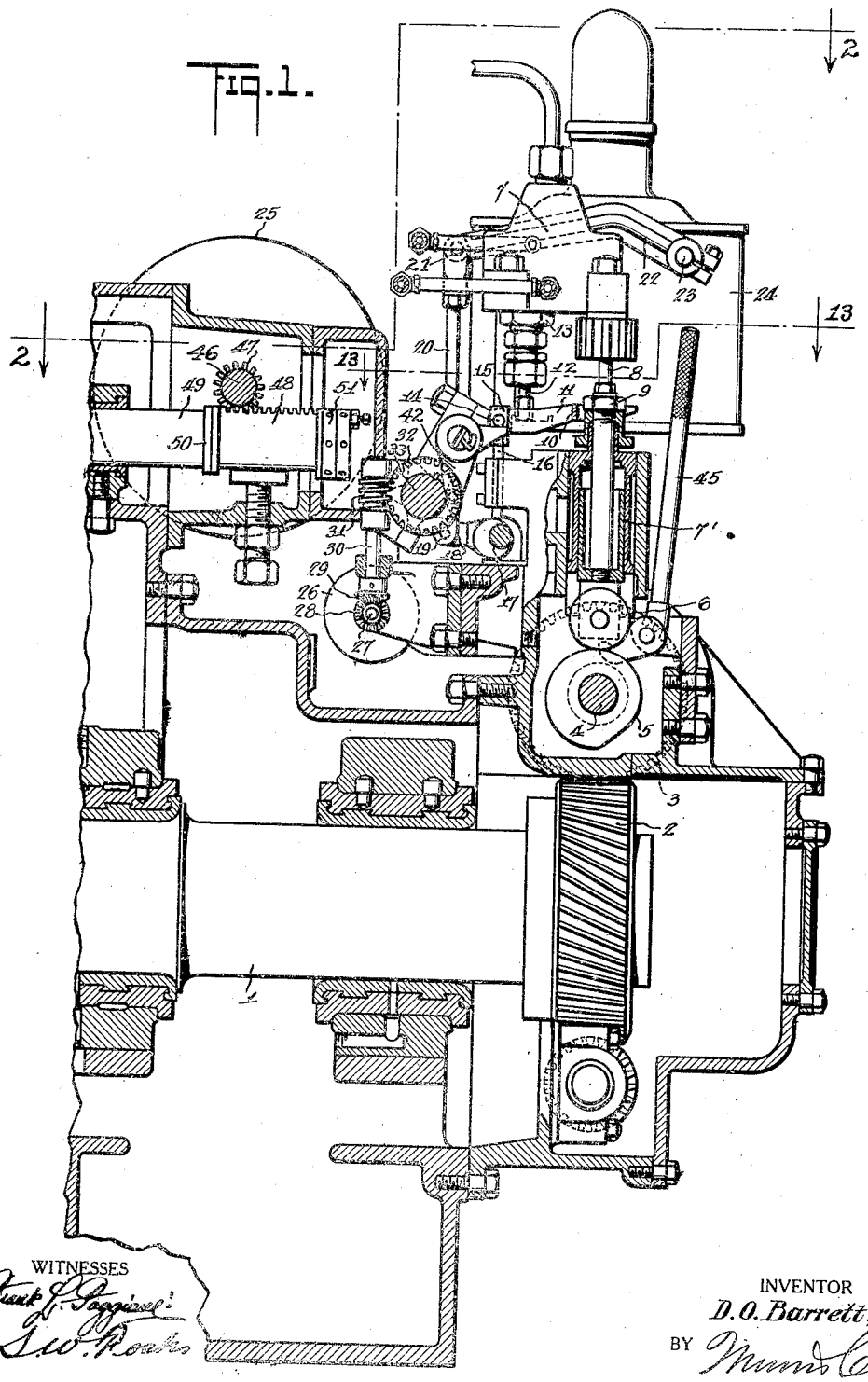
WITNESSES
INVENTOR
*D. O. Barrett,*
BY
ATTORNEYS Nov. 10, 1931.  D. O. BARRETT  1,831,646
STARTING AND CONTROLLING MECHANISM FOR DIESEL ENGINES
Filed April 29, 1926   6 Sheets-Sheet 2
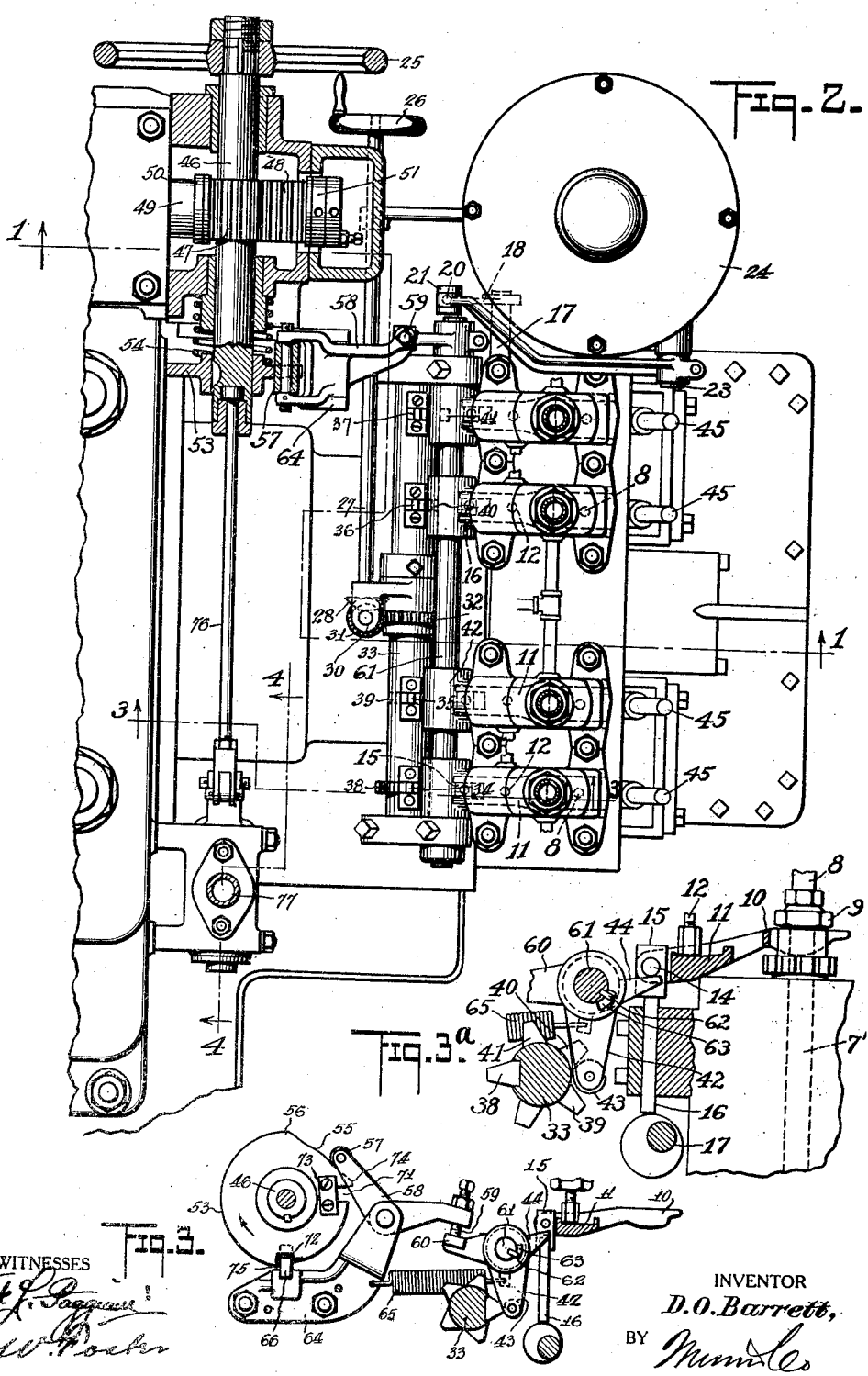
INVENTOR
D. O. Barrett,
BY
ATTORNEYS

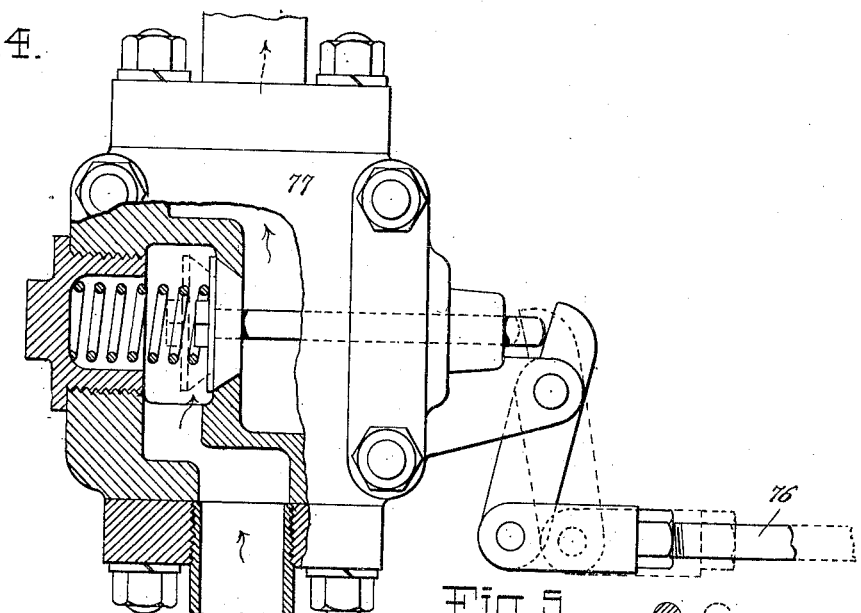
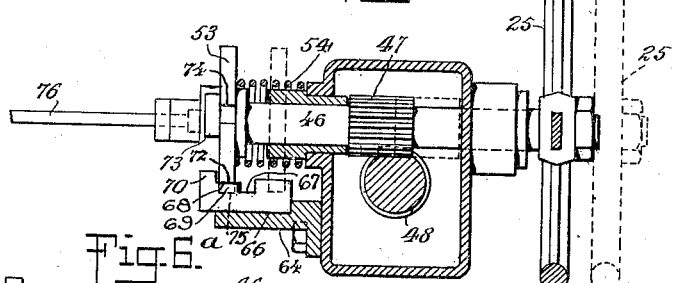
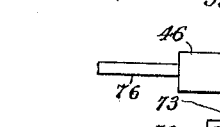
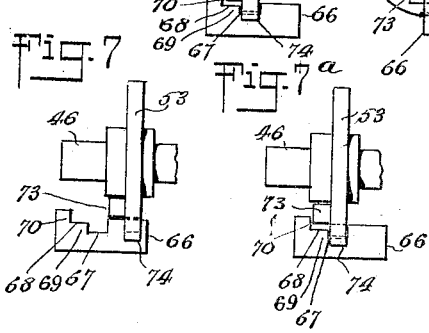
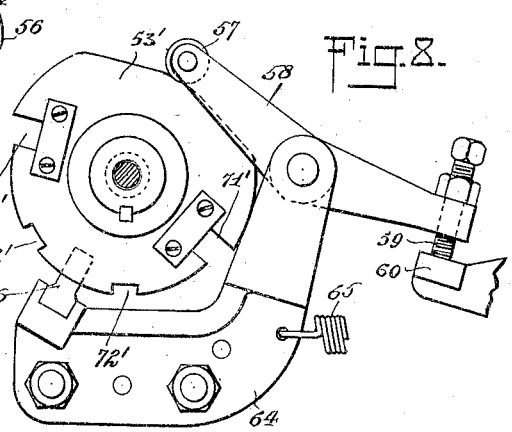

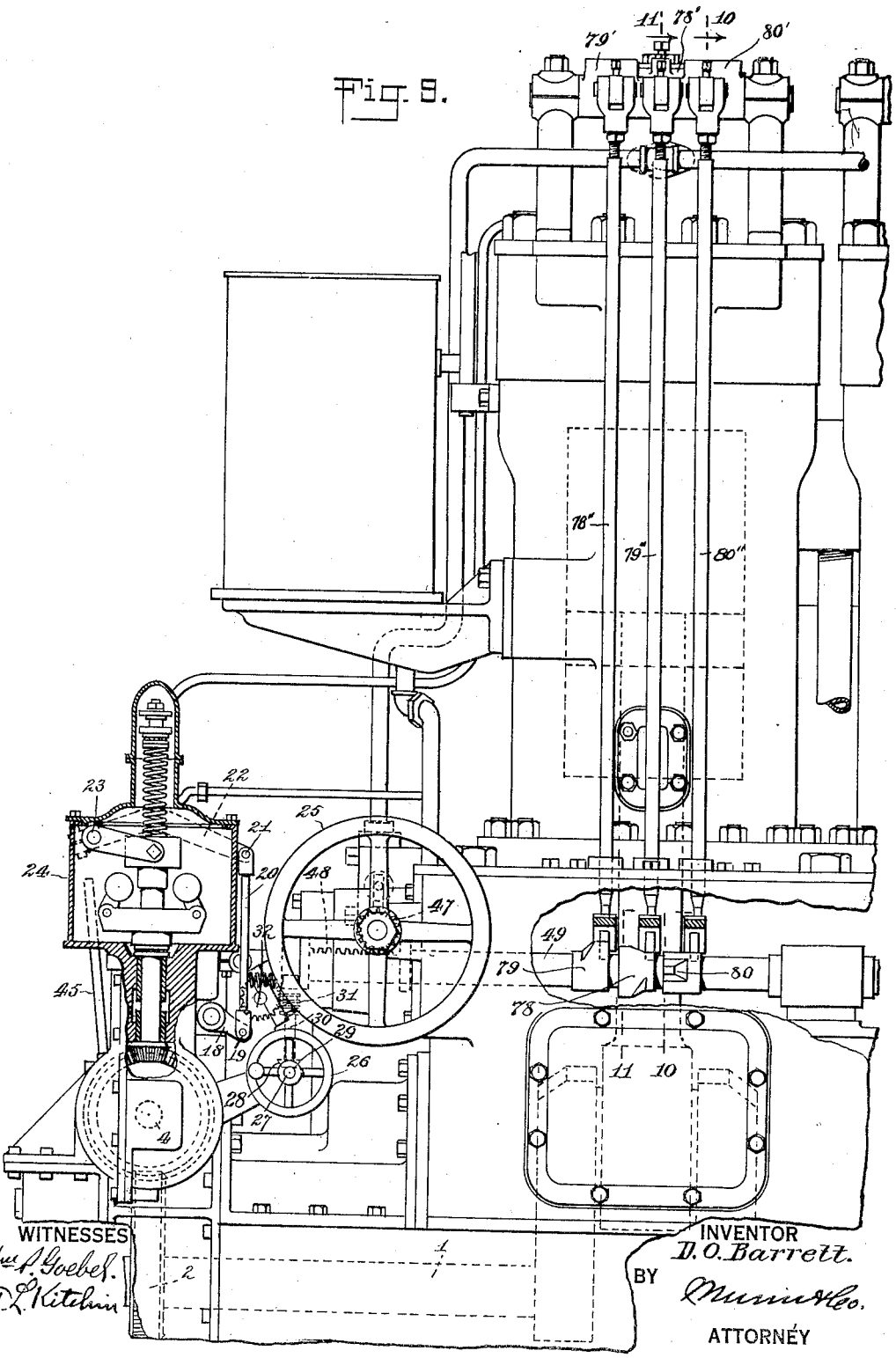

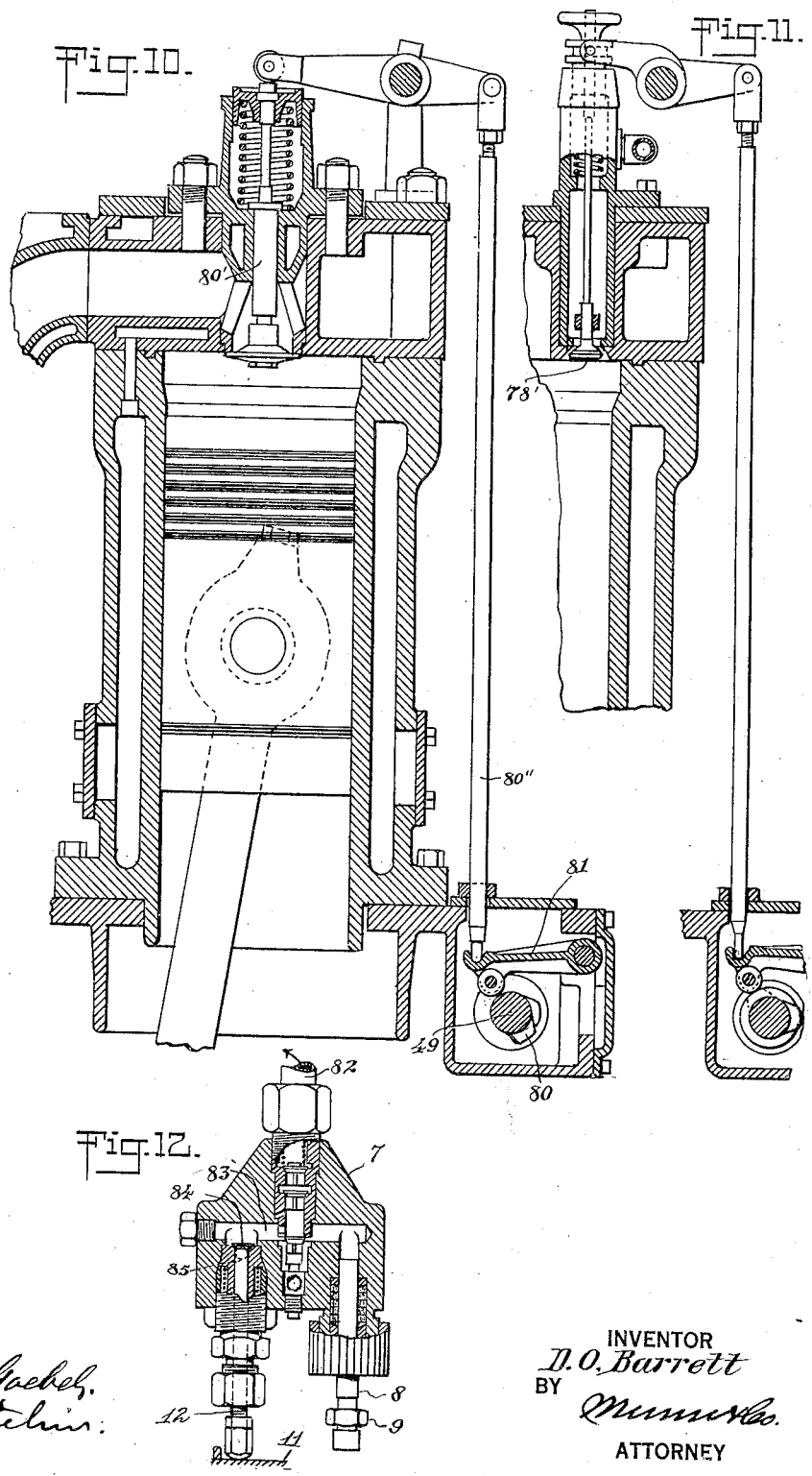

Nov. 10, 1931.     D. O. BARRETT     1,831,646
STARTING AND CONTROLLING MECHANISM FOR DIESEL ENGINES
Filed April 29, 1926     6 Sheets-Sheet 6

WITNESSES
William P. Goebel.
A. L. Kitchin.

INVENTOR
D. O. Barrett.
BY
ATTORNEY

Patented Nov. 10, 1931

1,831,646

UNITED STATES PATENT OFFICE

DWIGHT O. BARRETT, OF SPRINGFIELD, OHIO

STARTING AND CONTROLLING MECHANISM FOR DIESEL ENGINES

Application filed April 29, 1926. Serial No. 105,520.

This invention relates to devices for starting and controlling the mechanism of oil burning engines, as for instance, engines of the Diesel type and is applicable to either the two or four cycle type, the object of the invention being to provide means whereby the engine may be easily started and controlled.

Another object of the invention is to provide an improved starting and controlling mechanism manually actuated whereby the parts to be operated are reduced to a minimum when starting the engine and also whereby the parts for controlling manually the speed of the engine are reduced to a minimum.

An additional object of the invention is to provide an improved control mechanism for oil burning engines wherein by manual action one or any number of the cylinders may be thrown out of operation or may be deprived of some of the fuel so as to reduce the power thereof.

In the acompanying drawings—

Figure 1 is a fragmentary vertical sectional view through part of a Diesel engine disclosing an embodiment of the invention applied thereto the section being taken on line 1—1 of Figure 2.

Figure 2 is a fragmentary top plan view of the structure shown in Figure 1, certain parts being broken away for better illustrating the construction, the figure being taken approximately on line 2—2 of Figure 1.

Figure 3 is an end view of the starting cam and associated parts shown in Figure 2.

Figure 3ª is a fragmentary view showing the parts at the right of Figure 3 but with the parts enlarged and with the addition of certain guides and associated parts for better illustrating the detail structures.

Figure 4 is an enlarged side view of the air valve shown in Figure 2, certain parts being broken away for disclosing certain of the operating mechanism.

Figure 5 is a diagram showing the starting cam and associated parts in the running position.

Figure 6 is a fragmentary view similar to the left end portion of Figure 5 but showing the parts in what may be termed a stopped position.

Figure 6ª is a side view of the structure shown in Figure 6.

Figure 7 is a view similar to Figure 6 but showing the parts in a starting position.

Figure 7ª is a view similar to Figure 7 but showing the starting cam in running position.

Figure 8 is an enlarged view showing a modified form of starting cam to that illustrated in Figure 3 whereby the engine may be readily reversed.

Figure 13:
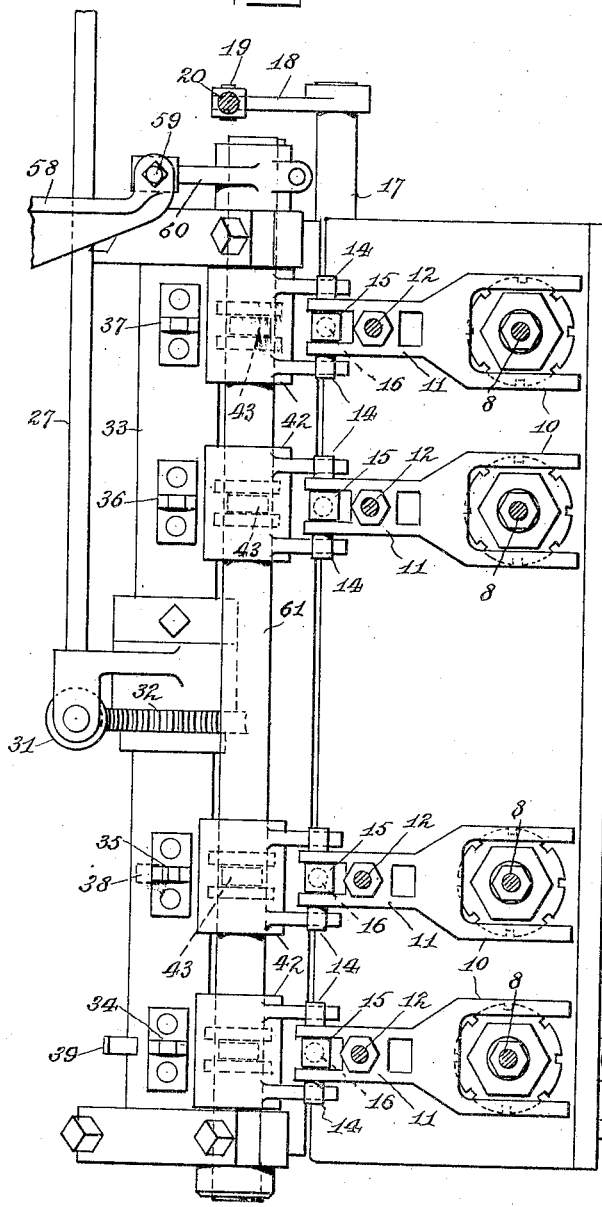
Figure 14:
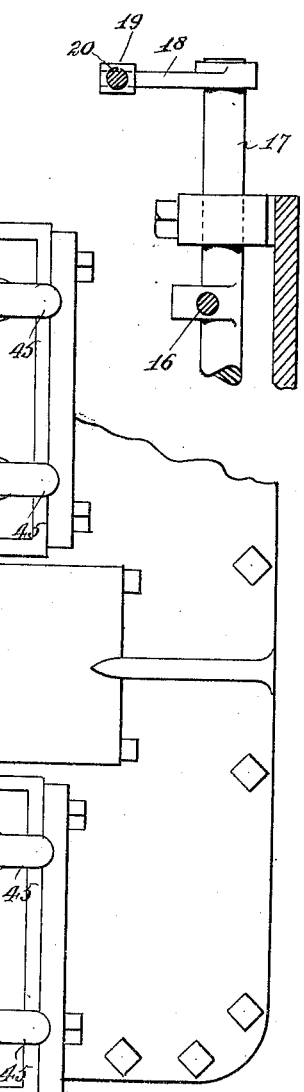

Figure 9 is a side view of one end of a Diesel engine supplied with mechanism embodying the invention, certain parts being broken away;

Figure 10 is a vertical sectional view through the exhaust valve shown in Figure 9, the same being taken on line 10—10 of Figure 9;

Figure 11 is a fragmentary sectional view through Figure 9 on the line 11—11;

Figure 12 is a vertical sectional view through the by-pass structure shown in Figure 1;

Figure 13 is a fragmentary sectional view through Figure 1 on the line 13—13;

Figure 14 is a detail fragmentary sectional view showing certain cam and lever members embodying certain features of the invention.

The present invention is limited to the starting and control mechanism for oil burning engines, as for instance, a Diesel engine and, therefore, the mechanism may be readily applied to the two or four cycle type of engine and to engines using a separate pump for injecting the fuel directly into a corresponding cylinder or to those in which the common rail system is used where pressure is maintained in a line and from this line the oil is supplied to the cylinders. It is also evident that the invention may be applied to a Diesel engine in which the governor control is as shown in the accompanying drawings or where some other form of control is used. In order to better set forth the invention, certain parts of the Diesel engine which are old and well known will be described in order to show their connection with the improved control and starting mechanism embodying the invention.

As indicated in Figure 1, 1 indicates the crank shaft of the engine on which is mounted a spiral gear 2 meshing with the gear 3 which is secured to the shaft 4. In this way the shaft 4 is rotated in proper time with the rotation of the crank shaft and operates the various cams 5 which in turn operate the various rollers 6 connected to the pumps 7. The slide 7' is of any usual or preferred structure in Diesel engines and is provided with the usual plunger 8 having a nut 9 coacting with the by-pass fork 10. This fork is of the usual construction and is provided with a portion or seat 11 engaging the stem 12 of the by-pass valve 13. The various forks 10 are pivotally mounted at 14 to members 15 and the members 15 in turn carry by-pass fork slides 16. These slides normally rest on a shaft 17 which is eccentrically mounted and which is provided with an arm 18 pivotally connected at 19 to the rod 20. The rod 20 at the upper end is pivotally connected at 21 to the arm 22, said arm being connected through shaft 23 to a governor 24 of any desired kind. The governor 24 may be of any desired kind and will, therefore, function in a certain way in respect to the speed of the engine so that as the engine increases in speed, arm 22 will be gradually raised and as it is raised it will turn the eccentrically mounted shaft 17 so as to raise the slides 16 and the pivotal ends of forks 10. As this action takes place and as pumps 7 are functioning, the by-pass valve 13 is opened more and more and in this way the cylinders are deprived more and more of the fuel so that the speed of the engine is reduced or rather maintained but is not allowed to increase beyond a desired speed. It is, of course, evident that the governor 24 could be set to cause the engine to run at any desired speed.

The parts above described are old and well known and, therefore, all parts of the engine have not been described but only those parts which in some way co-act with the starting and control mechanism embodying the invention. This mechanism includes parts associated with the hand wheel 25 and also the hand wheel 26. The hand wheel 25 is used for starting the engine while the hand wheel 26 is used for manually stopping the engine, stopping one or more cylinders or causing a manual regulation of the speed of the engine independent of the governor 24.

In respect to the control mechanism which includes the parts associated with the hand wheel 26, it will be noted that this hand wheel is connected to a shaft 27 to which is secured a bevel gear 28 meshing with the pinion 29, which pinion is rigidly secured to shaft 30. A worm 31 is secured to shaft 30 and meshes continually with the worm wheel 32 whereby whenever the hand wheel 26 is rotated, worm wheel 32 and the shaft 33 to which it is rigidly secured, is also rotated or partly rotated. The shaft 33 is a comparatively large shaft and is provided with cams 34, 35, 36 and 37 in alignment as illustrated in Figures 2 and 13. It will, therefore, be noted that all of these cams will function at the same time. Associated with these cams are cams arranged spirally around the shaft 33, said spiral cams being cams 38, 39, 40 and 41 adapted to function at different times. Associated with the shaft 33 is an arm 42 for each of the cams 34 to 41 inclusive and each of these arms is provided with a roller 43 at the lower end as shown in Figure 3ª, said rollers being engaged simultaneously by the various cams 34 to 41 inclusive for swinging the various arms 42 for raising the members 12 and 16 and also raising the pivotal ends of the forks 10. This action is carried out by reason of the fact that there is a lug or projection 44 extending from each lever 42, said lug or projection being positioned adjacent the lower portion of the respective members 15 when the various rollers 43 are resting against the shaft 33. This will permit the slides 16 to function ordinarily but whenever the shaft 33 is operated, the swinging of the arm 42 will cause the lugs 44 to raise the pivotal ends of the forks 10 to such an extent that all of the oil is by-passed when the arms 42 are swung to their extreme position. If the arms are swung only half way to their extreme position, approximately half of the oil will be by-passed and so on according to the respective positions of the cams 34 to 37 inclusive. If any one pump 7 is to be rendered ineffective, shaft 33 is turned until one of the spirally mounted cams is caused to function. For instance, if the first pump shown in Figure 2 is to be rendered ineffective, shaft 33 is turned until the cam 38 has swung the lever 42 to the position shown in Figure 3. This will render ineffective this individual pump as the fork 10 of this pump has been elevated until all of the oil is by-passed. This will permit repair or inspection of this particular pump and if desired, the roller 6 may be elevated by shifting the hand lever 45. By shifting the shaft 33 from one position to another so as to cause the various cams 38 to 41 to function, the various pumps may be successively rendered ineffective and held ineffective individually for any length of time or partly held ineffective. It will thus be seen that the amount of fuel to the engine may be controlled by the governor 24 or may be manually controlled by the action of the manual turning of the hand wheel 26.

In respect to the starting mechanism which is operated by the hand wheel 25, it will be observed that this hand wheel is keyed or otherwise rigidly secured to the shaft 46, which shaft has a pinion 47 rigidly secured thereto, said pinion continually meshing with the rack 48, which rack is mounted on one end of the cam shaft 49, said cam shaft being the usual cam shaft of the engine and, consequently, will not need any detail description. It will be noted, however, that this shaft is connected with the various cams 78, 79 and 80 controlling the air and oil to the cylinders. However, the invention relates to the mechanism for shifting the shaft 49 rather than to the cams or other parts controlled thereby. From Figure 1 it will be observed that there is provided a bearing shoulder 50 and a pair of nuts 51 for confining the rack 48 whereby the pinion 47 may properly function and also the shaft 49 may properly function. After the shaft 49 is rocked or rotated, the rack 48 is held against rotation by the gear wheel 47 and the adjustable support as clearly shown in Figure 1. At the inner end of shaft 46, the starting cam 53 is rigidly secured to the shaft and is acted on by a spring 54 for normally holding the same in the position shown in Figure 2. This cam as shown in Figure 3, is provided with a reduced section 55 which merges into a high point 56 for swinging the roller 57 and bell crank lever 58 for causing a proper action of the screw 59 on the arm 60, which arm is rigidly secured to the shaft 61. It will be noted that the shaft 61 carries a key 62 which fits into the slot 63 of each of the levers 42 so that when shaft 61 is operated, the levers may be swung as well as when the cams on shaft 33 function to swing the levers. By reason of this slot, however, the levers 42 may function independently of shaft 61. The bell crank lever 58 is pivotally mounted on the bracket 64 to which springs 65 are secured, said springs being also connected with the arms 42 for causing the same to normally move toward the shaft 33. A locking plate 66 is carried by the bracket 64 and is provided with a notch 67 (Figure 7) and an offset 68 whereby there is presented a guiding section 69 and a stop or shoulder 70. This locking piece co-acts with the starting cam 53 and particularly with the notches 71 and 72. It will be noted that the bottom of notch 72 is further from the center of shaft 46 than the bottom of notch 71. Associated with the notch 71 is a stop 73. It will also be noted that there is a slight extension or projection 74 on one side of notch 71 and a slight extension or projection 75 on one side of notch 72 whereby only a quarter of a turn of the cam 53 may be made.

When the parts are in the position shown in Figure 3, the cam 53 and associated parts are in running position, said position being the same as that shown in Figure 5. To start the engine after it has been stopped while the parts are in the position shown in Figure 3, the hand wheel 25 would be pulled outwardly until the cam 53 is in the position shown in Figure 6, after which it would be turned or rotated in the direction of the arrow in Figure 3 until the projection 74 struck the locking piece 66. The turning of the shaft 46 as the cam wheel 53 is turned will cause the pinion 47 (Figures 1 and 5) to move rack 48 and shift the shaft 49 (Figure 9) until the air cams 78 of the engine have been brought into proper position so that when the hand wheel 25 is given the final pull to move the parts to the position shown in Figure 7, this will move the rod 76 (Figures 4 and 5) to such an extent as to open the air valve 77 as shown in dotted lines in Figure 4, and immediately the engine will begin to turn over under the action of air. When the engine has attained the desired speed, the hand wheel 25 is pushed in until the stop 73 strikes the shoulder or abutment 70 and then shaft 46 and associated parts are quickly turned until the shoulder 75 strikes the locking piece 66. This turning movement shifts the shaft 49 and, consequently, the cams thereon so that the inlet cams 79 and exhaust cams 80 (Figure 9) are placed in the proper sequence and the air cams cut out of action and at the same time the roller 57 (Figure 3) drops into the depression 55 and thus allows the lever 60 to rise thus allowing shaft 61 and keys 62 to rotate so that bell cranks 42 and extensions 44 drop back to the running position. The seat 11 (Figures 1 and 2) is thus dropped back away from the bypass valve stem 12 allowing the same to close and thus fuel is pumped directly to the engine cylinders. Shaft 33 must, of course, be turned so that none of the cams are beneath the rollers 43. The engine would operate properly with the parts in the position just described but in order to prevent any accidental movement of the parts, wheel 25 is moved inwardly a short distance further until the parts assume the position shown in Figure 5 wherein the portion 69 will be projecting into the notch 72 and will prevent accidental turning of the cam 53 and associated parts. The spring 54 will automatically act to hold the parts in the position just described, namely, the position shown in Figure 5.

Where the engine is to be reversed and where the reversal may take place quite often, the structure shown in Figure 8 is used instead of that shown in Figure 3. These two structures are substantially identical except that the cams 53' shown in Figure 8 is provided with two notches 72' and two notches 71', one notch 71' being a starting notch for starting the engine forward similar to the way the preferred structure is used and the other being a starting notch for starting the engine rearward the operation being the same as the operation of the structure shown in Figure 3 except in a reverse direction. It will be noted that the manual starting structure which includes the hand wheel 25 is quickly operated so that the air is properly turned on and then quickly turned off as soon as the proper speed has been secured and the parts eventually locked in the running position. At any time the hand wheel 26 may be actuated to manually control the speed or to throw out any of the pumps and this action will not in any way affect the action of the governor 24 which will continue to function as if it was still in control and which resumes control as soon as the shaft 33 and associated parts have been moved to an inoperative position. As shown in Figures 9 to 12, the structure is of the usual Diesel type but associated with a specific control arrangement. In Figure 9 the casing has been broken away to illustrate the cams 78 to 80 inclusive which operate the air valve and associated parts 78′, the intake valve and associated parts 79′ and the exhaust valve and associated parts 80′. As shown in Figure 10, when the shaft 49 rotates and the cam 80 is in the right place the swinging member 81 will be raised, and consequently, the exhaust rod 80″ will be raised for opening the exhaust valve. The same construction is used in regard to the air valve, as shown in Figure 11. Also, the same structure is used in regard to the intake valve 79′. It will be understood that the air valve and the exhaust valve coact and operate in proper sequence when air is being used to turn the engine over. It will also be evident that the intake valve and the exhaust valve coact and open and close in proper time when fuel is being used. These parts are old and well-known and it is, therefore, thought that no additional description will be needed, the invention consisting in the parts heretofore described for shifting these valves in a convenient manner and for shifting and operating certain other parts. By the use of the various forks 10 with their seats 11, means have been provided which coact with the cams on shaft 17 and also with the arm 44 and associated parts, whereby an automatic control is provided to supply the proper amount of fuel to cause the engine to run at a certain speed. Through the use of the governor the engine is supplied with a greater or less amount of fuel according to the load so that the engine will maintain substantially a constant speed. By operating the hand mechanism the forks may be moved so that the by-passes will be all opened or any one opened, whereby the engine is deprived of fuel in this manner and, consequently, stopped. In regard to the by-pass, it will be noted from Fig. 12 that when the pump is forcing oil through the pipe 82 the chamber 83 will be filled with oil, and if the by-pass valve 84 is open the oil will pass through the by-pass outlet 85. The by-pass rod 12 is adapted to be raised by the forks 10 and this is done quickly and to the full extent when it is desired to by-pass all of the oil to stop the engine or deprive one engine of fuel. Where it is merely to regulate the speed the rod 12 is raised for only a short distance or enough to by-pass only part of the oil being pumped.

What I claim is:

1. In an oil burning engine provided with a plurality of cylinders and a cam shaft, means for forcing fuel-oil into each of said cylinders, means for regulating the amount of fuel forced into the respective cylinders, means for starting the engine with air pressure, manually actuated means for causing said starting means to function, said manually actuated structure including a hand wheel, a control shaft secured to said hand wheel, said shaft being slidable longitudinally and also rotatably, a pinion connected with said shaft, a rack meshing with said pinion, said rack being mounted on said cam shaft of the engine whereby when the hand wheel is rotated the cam shaft will be moved longitudinally, and means for locking said control shaft against accidental movement.

2. In a starting mechanism for Diesel and other oil burning engines using compressed air for starting and provided with a set of control valves, a cam shaft, a set of cams carried by said cam shaft for said set of control valves, and an air control valve, a rack secured to said cam shaft, a pinion meshing with said rack, a reciprocating and rotating control shaft secured to said pinion, manually actuated means for reciprocating and rotating said shaft, means connecting said control shaft with said air control valve, a control member for regulating the turning movement of said control shaft so that said cam shaft will be moved to a starting position when the control shaft has been rotated to a given point, said air valve being moved to functioning position when said reciprocating shaft has been shifted longitudinally to a given position after its rotation for setting said cam shaft to starting position.

3. In a manually actuated control for a Diesel and other oil burning engine started with compressed air provided with a cam shaft, a set of control valves, cams on said cam shaft for operating said control valves, and an air valve, a rack and pinion operatively associated with said cam shaft, a manually actuated control shaft connected with said pinion, means for connecting said control shaft with said air valve whereby when said control shaft is rotated to a certain extent said cams will be moved for setting said control valves to starting position and when said shaft is moved longitudinally a certain distance said air valve will be caused to function.

DWIGHT O. BARRETT.